US011780266B2

(12) United States Patent
Matsuoka et al.

(10) Patent No.: US 11,780,266 B2
(45) Date of Patent: Oct. 10, 2023

(54) TIRE WITH SPECIFIED BELT LAYERS OF 1X4 STEEL CORDS

(71) Applicants: SUMITOMO ELECTRIC TOCHIGI CO., LTD., Tochigi (JP); SUMITOMO ELECTRIC INDUSTRIES, LTD., Osaka (JP); SUMITOMO RUBBER INDUSTRIES, LTD., Hyogo (JP)

(72) Inventors: Akifumi Matsuoka, Tochigi (JP); Kazuhiko Saito, Tochigi (JP); Shinei Takamura, Hyogo (JP); Masumi Suzuki, Hyogo (JP); Koji Fujisawa, Hyogo (JP)

(73) Assignees: SUMITOMO ELECTRIC TOCHIGI CO., LTD., Tochigi (JP); SUMITOMO ELECTRIC INDUSTRIES, LTD., Osaka (JP); SUMITOMO RUBBER INDUSTRIES, LTD., Hyogo (JP)

( * ) Notice: Subject to any disclaimer, the term of this patent is extended or adjusted under 35 U.S.C. 154(b) by 704 days.

(21) Appl. No.: 16/090,401

(22) PCT Filed: Feb. 9, 2017

(86) PCT No.: PCT/JP2017/004674
§ 371 (c)(1),
(2) Date: Oct. 1, 2018

(87) PCT Pub. No.: WO2017/175475
PCT Pub. Date: Oct. 12, 2017

(65) Prior Publication Data
US 2019/0111735 A1    Apr. 18, 2019

(30) Foreign Application Priority Data
Apr. 5, 2016    (JP) .................. 2016-076076

(51) Int. Cl.
*B60C 9/20*    (2006.01)
*B60C 9/00*    (2006.01)
*D07B 1/06*    (2006.01)

(52) U.S. Cl.
CPC .............. *B60C 9/0057* (2013.01); *B60C 9/00* (2013.01); *B60C 9/0007* (2013.01); *B60C 9/20* (2013.01);
(Continued)

(58) Field of Classification Search
None
See application file for complete search history.

(56) References Cited

U.S. PATENT DOCUMENTS 1,742,777 A * 1/1930 Midgley ................ B29D 30/38
156/179 X
3,843,434 A * 10/1974 Heiks et al. .......... B29D 30/38
156/906 X
(Continued)

FOREIGN PATENT DOCUMENTS

JP    H05-140881    6/1993
JP    H06-166970    6/1994
(Continued)

OTHER PUBLICATIONS

English translation of the International Report on Patentability (PCT/IB/373) for international application PCT/JP2017/004674 dated Oct. 9, 2018.*
(Continued)

*Primary Examiner* — Adrienne C. Johnstone
(74) *Attorney, Agent, or Firm* — IPUSA, PLLC

(57) ABSTRACT

A plurality of belt layers 7 are superimposed in a radial direction. The belt layers 7 include a plurality of steel cords 10 arranged in parallel in a row and rubber 11. The steel cords 10 have a 1×4 structure in which four filaments 20 are
(Continued)

twisted, and when a center-to-center distance between the steel cords 10 in at least two of the belt layers 7 adjacent in the radial direction is T, and an average diameter of virtual circumscribed circles of the steel cords 10 having the 1×4 structure is D, $1.25 \leq T/D \leq 2.25$.

7 Claims, 8 Drawing Sheets

(52) U.S. Cl.
CPC .......... *B60C 9/2006* (2013.01); *D07B 1/0606* (2013.01); *B60C 2009/0021* (2013.01); *B60C 2009/0085* (2013.01); *B60C 2009/0092* (2013.01); *B60C 2009/209* (2013.01); *B60C 2009/2048* (2013.01); *B60C 2009/2064* (2013.01); *B60C 2009/2067* (2013.01); *B60C 2009/2077* (2013.01); *B60C 2009/2093* (2013.01); *B60C 2009/2096* (2013.01)

(56) References Cited

U.S. PATENT DOCUMENTS

| | | | | |
|---|---|---|---|---|
| 4,047,552 A | * | 9/1977 | Maeda | B60C 9/2006 152/526 |
| 4,258,543 A | * | 3/1981 | Canevari | B60C 9/0007 57/902 |
| 5,318,643 A | * | 6/1994 | Mizner | B60C 9/0007 152/527 X |
| 2013/0139940 A1 | * | 6/2013 | Ito | 152/451 |
| 2015/0258855 A1 | * | 9/2015 | Oya | B60C 9/2006 152/527 |
| 2018/0022160 A1 | | 1/2018 | Astaix et al. | |

FOREIGN PATENT DOCUMENTS

| | | |
|---|---|---|
| JP | H07-047806 | 2/1995 |
| JP | H10-259582 | 9/1998 |
| JP | H10-297213 | 11/1998 |
| JP | H11-192810 | 7/1999 |
| JP | H11-241282 | 9/1999 |
| JP | 2001-001717 | 1/2001 |
| JP | 2004-216977 | 8/2004 |
| JP | 2013-199193 | 10/2013 |
| JP | 2014-194095 | 10/2014 |
| JP | 2018-504316 | 2/2018 |
| WO | 2016/124422 | 8/2016 |

OTHER PUBLICATIONS

Gent, Alan Neville and Walter, Joseph D., Pneumatic Tire, US Department of Transportation, Feb. 2006, p. 97.*

* cited by examiner

FIG.5 COMPARATIVE

FIG.6 COMPARATIVE

TIRE WITH SPECIFIED BELT LAYERS OF 1X4 STEEL CORDS

TECHNICAL FIELD

The present invention relates to a tire. The present application is based upon and claims the benefit of priority of Japanese Patent Application (No. 2016-076076), filed on Apr. 5, 2016, the entire contents of the Japanese Patent Application are incorporated herein by reference.

BACKGROUND ART

Radial tires are known from Patent Document 1 and the like. Radial tires include belt layers including steel cords and rubber covering the steel cords. A steel cord is composed of a large number of filaments. In Patent Document 1, it is proposed to set the strength per steel cord and the ply strength to be specific values in order to achieve both reduction in weight and improvement in strength.

PRIOR ART DOCUMENT

Patent Document

[Patent Document 1] Japanese Laid-open Patent Publication No. 2001-001717

SUMMARY OF THE INVENTION

A tire according to the present disclosure is a tire including a plurality of belt layers superimposed in a radial direction, wherein the belt layers include a plurality of steel cords arranged in parallel in a row and rubber that covers the steel cords, and wherein the steel cords have a 1×4 structure in which four filaments are twisted, and when a center-to-center distance between the steel cords in at least two of the belt layers adjacent in the radial direction is T, and an average diameter of virtual circumscribed circles of the steel cords is D, T/D is greater than or equal to 1.25 and less than or equal to 2.25.

EMBODIMENT FOR CARRYING OUT THE INVENTION

Figure 1:
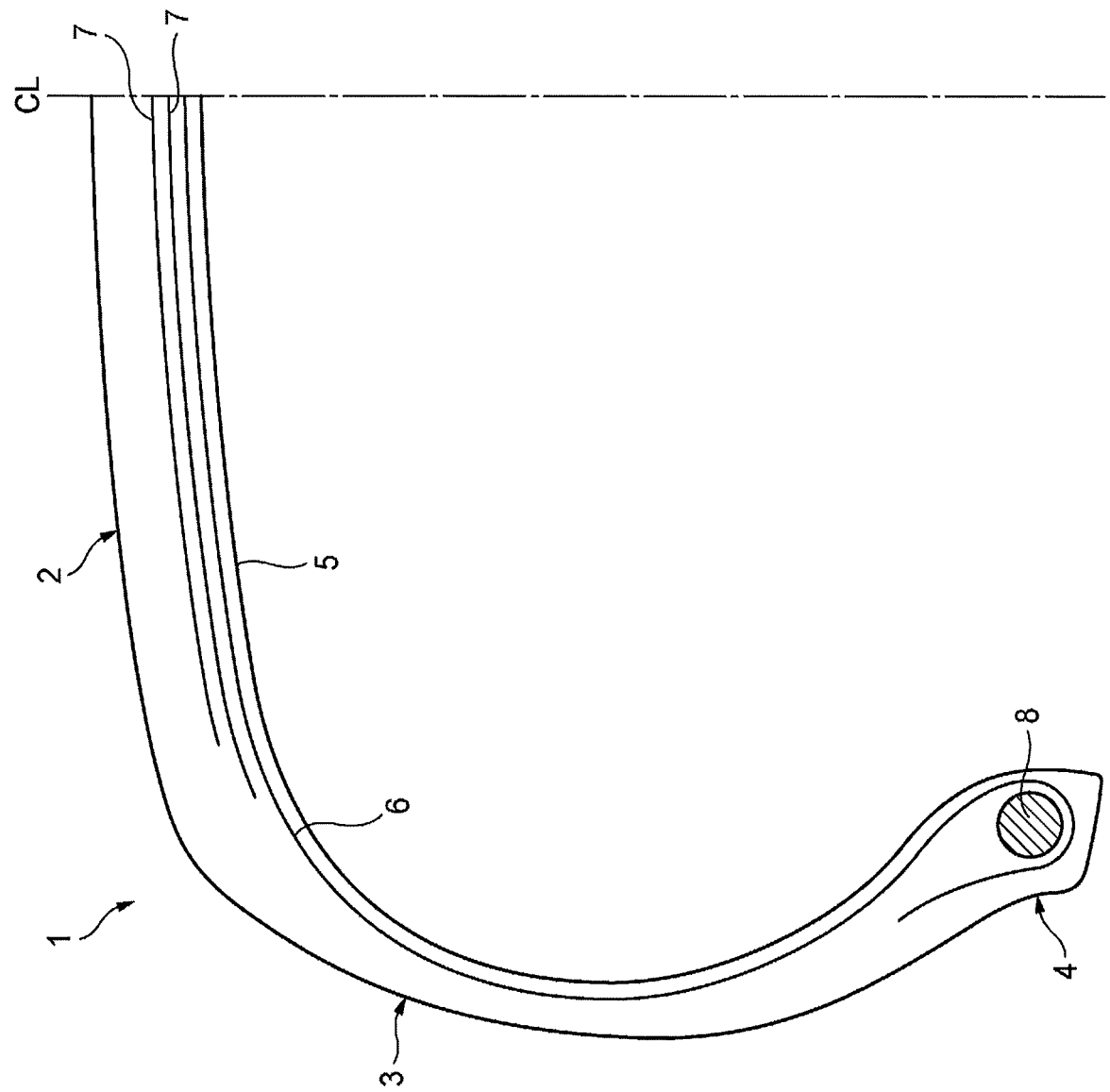
FIG. 1 is a cross-sectional view of a tire according to an embodiment of the present invention.

Problem to Be Solved by the Present Disclosure

Here, in recent years, there has been an increasing demand for weight reduction of tires for the purpose of reducing fuel consumption. Although various methods are attempted to reduce the weight of tires such as reducing the weight of steel cords and reducing the amount of rubber, it is necessary to maintain a comfortable ride by tires that is importance performance.

In order to secure a comfortable ride, it is considered that it is important to secure cord strength and an adhesion area between cords and rubber. It is considered that a comfortable ride is secured by using a large number of filaments, increasing a contact area adhering to rubber, or the like. However, if it is tried to secure a comfortable ride by such a way, it is assumed that the cost is increased. Accordingly, an object of the present disclosure is to provide a tire that is lightweight and excellent in riding characteristics while suppressing an increase in cost.

Effect of the Present Disclosure

According to the present disclosure, it is possible to provide a tire that is lightweight and excellent in riding characteristics while suppressing an increase in cost.

Descriptions of Embodiment of the Present Disclosure

First, the summary of an embodiment of the present invention will be described. A tire in one embodiment according to the present invention is (1) a tire including a plurality of belt layers superimposed in a radial direction, wherein the belt layers include a plurality of steel cords arranged in parallel in a row and rubber that covers the steel cords, and wherein the steel cords have a 1×4 structure in which four filaments are twisted, and when a center-to-center distance between the steel cords in at least two of the belt layers adjacent in the radial direction is T, and an average diameter of virtual circumscribed circles of the steel cords is D, T/D is greater than or equal to 1.25 and less than or equal to 2.25.

According to the tire of (1), because the steel cords have the 1×4 structure, the balance between cost, a lightweight property, and ride comfort is excellent. Also, because T/D is greater than or equal to 1.25 and less than or equal to 2.25, ride comfort is further enhanced while maintaining lightweight. Note that a preferable range of T/D is greater than or equal to 1.3 and less than or equal to 2.0, and a more preferable range of T/D is greater than or equal to 1.35 and less than or equal to 1.80.

(2) The average diameter D may be greater than or equal to 0.2 mm and less than or equal to 1.5 mm. According to the tire of (2), both the strength of the steel cords and favorable performance of the tire can be achieved. When the average diameter D is less than 0.2 mm, it is difficult to sufficiently secure the strength of the steel cords. If the average diameter D is greater than 1.5 mm, the stiffness of the steel cords becomes excessively high and the performance of the tire degrades. Note that it is preferable that the average diameter D is in a range greater than or equal to 0.3 mm and less than or equal to and 1.2 mm.

(2) The center-to-center distance T may be greater than or equal to 0.4 mm and less than or equal to 1.6 mm. The tire of (3) is lightweight and excellent in durability. If the center-to-center distance T is less than 0.4 mm, the amount of rubber with which gaps between the cords are filled is small and the durability is inferior. If the center-to-center distance T is greater than 1.6 mm, the weight of the tire increases. Note that it is preferable that the center-to-center distance T is in a range greater than or equal to 0.5 mm and less than or equal to and 1.3 mm.

(4) The rubber elastic modulus E* of the tire may be greater than or equal to 5 MPa and less than or equal to 20 MPa. The tire of (4) is excellent in the balance between tire performance and productivity. When the rubber elastic modulus E* is less than 5 MPa, stiffness as a tire cannot be secured. When the rubber elastic modulus E* is greater than 20 MPa, the productivity degrades. Note that a preferable range of the rubber elastic modulus E* of the tire is greater than or equal to 7 MPa and less than or equal to 20 MPa, and a more preferable range of the rubber elastic modulus E* of the tire is greater than or equal to 8 MPa and less than or equal to 12 MPa. The rubber elastic modulus E* is measured using a test piece having a width of 5 mm, a thickness of 2 mm, and a length of 20 mm, at an initial load of 150 g, a frequency of 50 Hz, a dynamic strain of 1% and a temperature of 70° C.

(5) A cord breaking load×ends may be greater than or equal to 15,000 N and less than or equal to 40,000 N. According to the tire of (5), it is possible to reduce the cord weight of the tire while securing a necessary strength. If the cord breaking load×ends is less than 15,000 N, strength is insufficient and durability decreases. If the cord breaking load×ends is greater than 40,000 N, this increases a possibility that the steering stability decreases.

(6) In a cross-sectional view of a plane perpendicular to a longitudinal direction of the steel cords, a central portion surrounded by the four filaments may be filled with the rubber. According to the tire of (6), the gap between the filaments is also filled with the rubber. Therefore, it is difficult for the filaments to come into contact with moisture and it is possible to suppress the occurrence of rust in the filaments. Further, because a large contact area between the filaments and the rubber can be secured, sufficient adhesiveness can be secured.

(7) In at least one filament of the four filaments, bent portions and non-bent portions may be repeatedly formed along a longitudinal direction of the filament. According to the tire of (7), gaps can be formed between the filaments by the bent portions and the non-bent portions. Via the gaps, it is possible to put the rubber into the central portion surrounded by the filaments and it is easy to fill the central portion surrounded by the filaments with the rubber.

(8) A repetition pitch of the bent portions and the non-bent portions of the filament may be greater than or equal to 2.2 mm and less than or equal to 7.0 mm. According to the tire of (8), it is easy to form the bent portions and the non-bent portions and it is easy to put the rubber into the gaps between the filaments. If trying to make the repetition pitch less than 2.2 mm, it is difficult to form the bent portions and the non-bent portions, and the effect of putting the rubber into the gaps between the filaments is decreased. If trying to make the repetition pitch greater than 7.0 mm, a large-scale apparatus is required to form the bent portions and the non-bent portions, and the production cost is increased.

(9) When the filament is placed on a plane and a height from the plane to the bent portions, at the far side from the plane, is defined as a bending height, the bending height of the filament may be 0.2-fold or more and 0.8-fold or less of a diameter of the filament. According to the tire of (9), it is easy to put the rubber into the gaps between the filaments and it is easy to produce the steel cords. When the bending height is less than 0.2-fold, it is difficult to secure the gaps by the bent portions, and the effect of putting the rubber into the gaps between the filaments is decreased. If trying to make the bending height greater than 0.8-fold, there is a possibility that, when the filaments are twisted together, bent portions damage other filaments, which may cause disconnection.

Details of Embodiment of the Present Invention

In the following, examples of a tire according to the present invention will be described with reference to the drawings. It should be noted that the present invention is not limited to these examples. It is intended that all modifications indicated by the scope of the claims and within meanings equivalent to the scope of the claims are included.

FIG. 1 is a cross-sectional view of a tire 1 according to an embodiment of the present invention. As illustrated in FIG. 1, the tire 1 includes a tread portion 2, a sidewall portion 3, and a bead portion 4.

The tread portion 2 is a portion that contacts with a road surface. The bead portion 4 is provided at the inner diameter side with respect to the tread portion 2. The bead portion 4 is a portion that contacts with the rim of a wheel of a vehicle. The sidewall portion 3 connects the tread portion 2 and the bead portion 4. Upon the tread portion 2 receiving an impact from a road surface, the sidewall portion 3 elastically deforms and absorbs the impact.

The tire 1 includes an inner liner 5, a carcass 6, belt layers 7, and a bead wire 8. The inner liner 5 is made of rubber and hermetically seals the space between the tire 1 and the wheel. The carcass 6 forms a framework of the tire 1. The carcass is made of rubber and an organic fiber such as polyester, nylon, or rayon. The bead wire 8 is provided on the bead portion 4. The bead wire 8 receives a pull force applied to the carcass 6. The belt layers 7 tighten the carcass 6 to increase the stiffness of the tread portion 2. In the illustrated example, the tire 1 includes two belt layers 7. The two belt layers 7 are superimposed in the radial direction of the tire 1.

Figure 2:
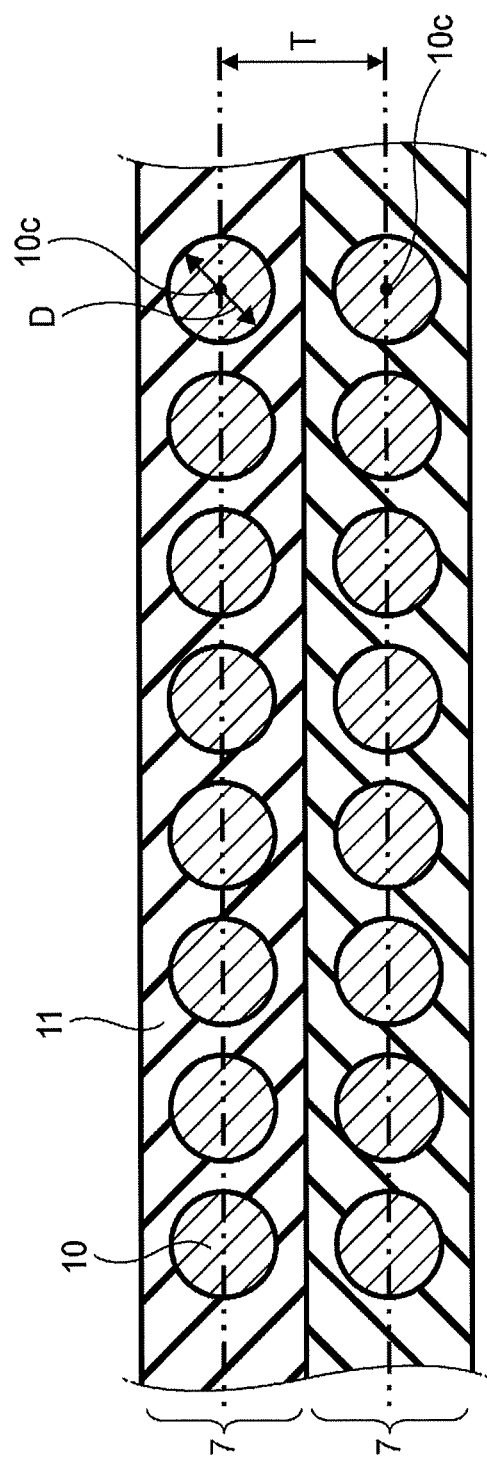
FIG. 2 is a diagram schematically illustrating two belt layers.

FIG. 2 is a diagram schematically illustrating the two belt layers 7. FIG. 2 illustrates a cross section perpendicular to the longitudinal direction of the belt layers 7 (the circumferential direction of the tire 1).

As illustrated in FIG. 2, the two belt layers 7 are superimposed in the radial direction. Each of the belt layers 7 includes a plurality of steel cords 10 and rubber 11. The plurality of steel cords 10 are arranged in parallel in one row. The rubber 11 covers the steel cords 10. The entire circumference of each of the steel cords 10 is covered with rubber 11. The steel cords 10 are embedded in the rubber 11.

Figure 3:
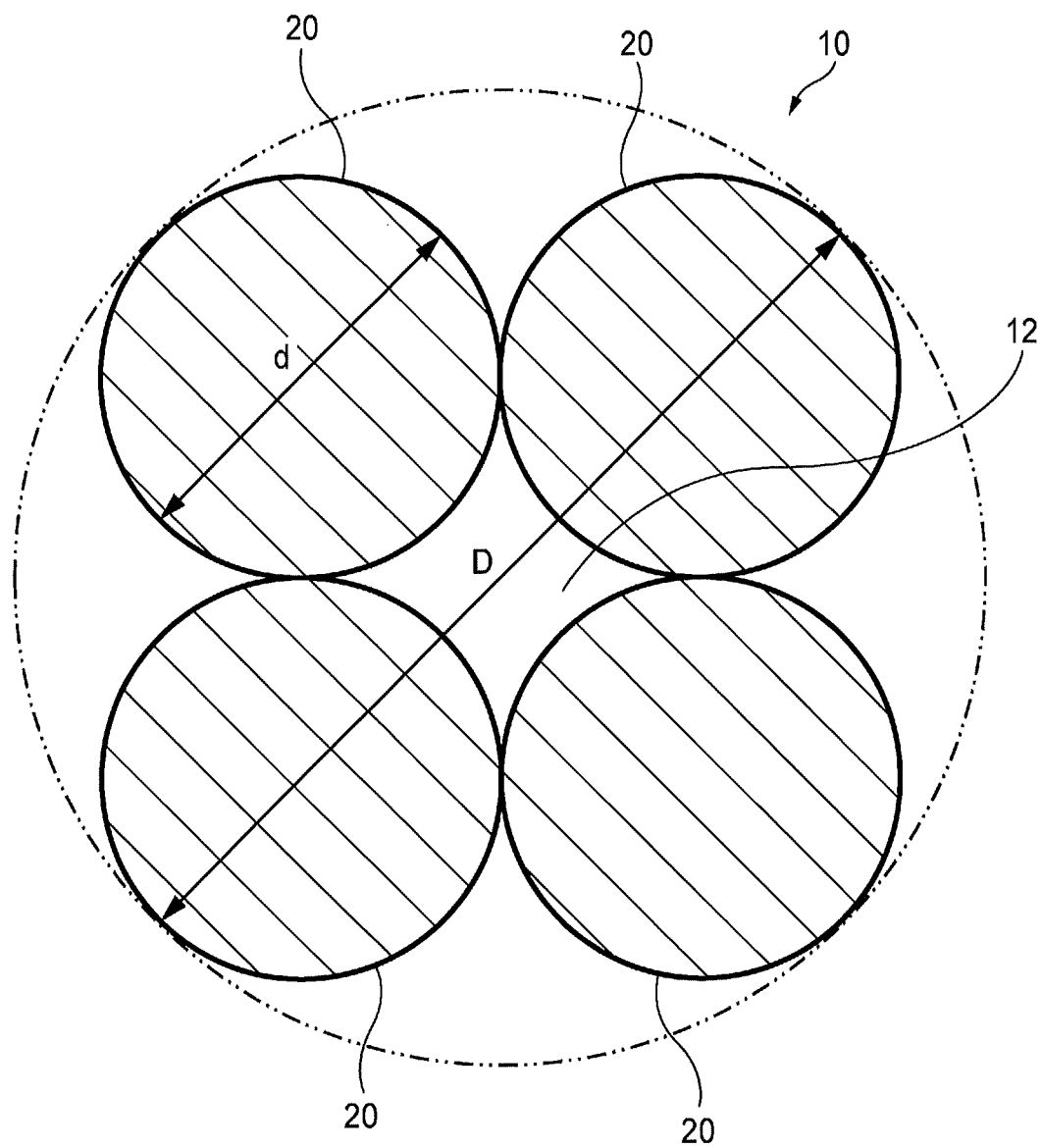
FIG. 3 is a cross-sectional view of a steel cord having a 1×4 structure.

FIG. 3 is a cross-sectional view of the steel cord 10 in a cross section perpendicular to the longitudinal direction of the steel cord 10. As illustrated in FIG. 3, the steel cord 10 is formed by twisting four filaments 20. The filaments 20 are twisted in a 1×4 structure. The four filaments 20 are spirally twisted together to constitute the single steel cord 10.

In FIG. 3, a two-dot chain line indicates a virtual circumscribed circle of the steel cord 10. As illustrated in FIG. 3, the virtual circumscribed circle of the steel cord 10 is a virtual circle with which the outer peripheral edges of the four filaments 20 are internally contact. Note that in FIG. 2, the virtual circumcircle circle of the steel cord 10 is illustrated as a line representing the steel cord 10.

There may be a case in which diameters of virtual circumscribed circles of the steel cord 10 take different values at a plurality of locations along the longitudinal direction of the steel cord 10. When looking at the cross section as illustrated in FIG. 3 at a plurality of locations along the longitudinal direction of the steel cord 10, there may be a case in which the positions of the filaments 20 differ. In this case, the diameters of the virtual circumscribed circles may differ in the respective cross sections. Therefore, the diameters of the virtual circumscribed circles are measured at a plurality of locations along the longitudinal direction, and the average value of these is referred to as the average diameter D of the virtual circumcircle circles of the steel cord 10. For example, a value measured by sandwiching four filaments 20 with a micrometer can be taken as the diameter of the virtual circumscribed circle. In this specification, the diameters of the virtual circumscribed circles are measured with a micrometer at five different locations along the longitudinal direction, and the average value of these is taken as the average diameter D of the virtual circumscribed circles of the steel cord 10.

It is preferable that the average diameter D of the virtual circumscribed circles of the steel cords 10 having the 1×4 structure is greater than or equal to 0.2 mm and less than or equal to 1.5 mm. When the average diameter D is less than 0.2 mm, it is difficult to sufficiently secure the strength of the steel cords 10. When the average diameter D is greater than 1.5 mm, the stiffness of the steel cords 10 becomes excessively high and the performance of the tire 1 degrades. Note that it is preferable that the average diameter D is greater than or equal to 0.3 mm and less than or equal to and 1.2 mm.

As illustrated in FIG. 3, in a cross-sectional view of a plane perpendicular to the longitudinal direction of the steel cords 10, a central portion 12 surrounded by the four filaments 20 is preferably filled with the rubber 11. In addition to the portions of the filaments 20 located at the outer circumferential side of the steel cord 10, the gap between the filaments 20 is also filled with the rubber 11. Therefore, it is difficult for the filaments 20 to come into contact with moisture and it is possible to suppress the occurrence of rust in the filaments 20. Further, because a large contact area between the filaments 20 and the rubber can be secured, sufficient adhesiveness can be secured.

Figure 4:
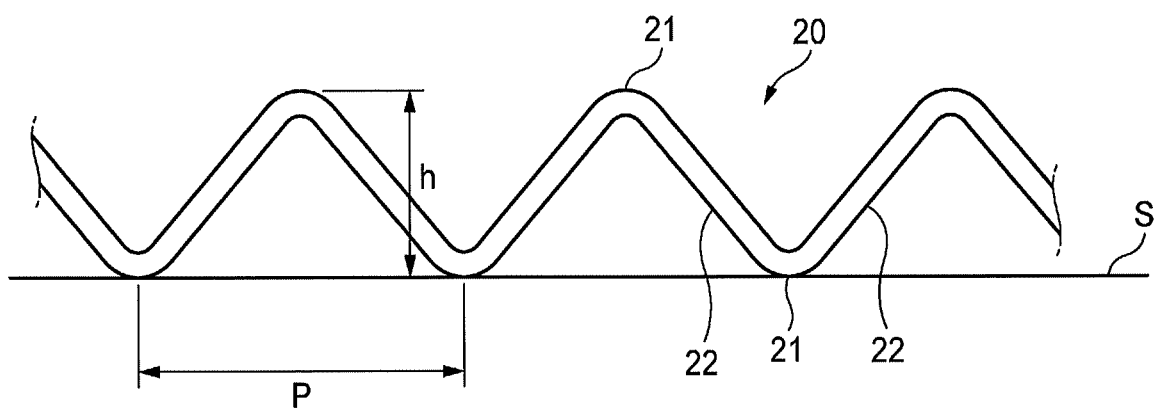
FIG. 4 is a diagram schematically illustrating a filament in which bent portions and non-bent portions are repeatedly formed.

FIG. 4 is a diagram schematically illustrating a filament 20. As illustrated in FIG. 4, it is preferable that bent portions and non-bent portions are repeatedly formed in at least one filament 20 of the four filaments 20. In the filament 20, the bent portions 21 and the non-bent portions 22 are alternately and repeatedly formed along the longitudinal direction. It is preferable that bent portions and non-bent portions are formed on the filament 20 before being twisted.

Gaps can be formed between the filaments 20 by the bent portions 21 and the non-bent portions 22. Via the gaps, it is easy to put the rubber 11 into the central portion 12 surrounded by the plurality of filaments 20 and it is easy to fill the central portion 12 surrounded by the filaments 20 with the rubber 11.

As illustrated in FIG. 4, the length from a bent portion 21 to an adjacent bent portion 21 along the longitudinal direction is referred to as the repetition pitch p of the bent portion and the non-bent portion. It is preferable that the repetition pitch p of the filament 20 is greater than or equal to 2.2 mm and less than or equal to 7.0 mm. If trying to make the repetition pitch P less than 2.2 mm, it is difficult to form the bent portions 21 and the non-bent portions 22, and the effect of putting the rubber 11 into the gaps between the filaments 20 is decreased. If trying to make the repetition pitch P greater than 7.0 mm, a large-scale apparatus is required to form the bent portions 21 and the non-bent portions 22, and the production cost is increased. Note that it is preferable that the repetition pitch p of the filament 20 is greater than or equal to 3.0 mm and less than or equal to 7.0 mm. It is more preferable that the repetition pitch p of the filament 20 is greater than or equal to 3.0 mm and less than or equal to 5.0 mm.

As illustrated in FIG. 4, when the filament 20 is placed on a plane S, the height from the plane S to the bent portions 21, at the far side from the plane S, is referred to as the bending height h. It is preferable that the bending height h of the filament 20 is 0.2-fold or more and 0.8-fold or less of the diameter of the filament 20. When the bending height h is less than 0.2-fold, it is difficult to secure the gaps between the bent portions 21 and the non-bent portions 22, and the effect of putting the rubber 11 into the gaps between the plurality of filaments 20 is decreased. If trying to make the bending height h greater than 0.8-fold, there is a possibility that, when the filaments 20 are twisted together, bent portions 21 damage other filaments 20, which may cause disconnection. Note that it is preferable that the bending height h of the filament 20 is 0.25-fold or more and 0.5-fold or less. It is more preferable that the bending height h of the filament 20 is 0.3-fold or more and 0.5-fold or less.

In order to reduce weight and cost, the fewer the number of filaments 20 constituting the steel cord 10 is, the better. However, if the number of filaments 20 is few, the cord strength and the like are insufficient and it is difficult to secure a comfortable ride. For example, it is impractical to constitute a steel cord 10 with one or two filaments 20.

Therefore, the inventors of the present invention have studied to constitute steel cords with three or more, for securing cord strength, and five or less filaments 20 for reducing weight and cost. Steel cords having 1×3, 1×4, 2×2, and 1×5 structures are considered in constituting steel cords with 3 or more and 5 or less filaments 20. The inventors of the present invention further investigated the steel cords having these structures.

In a steel cord having a 1×3 structure, the number of filaments is three, and it is easy to constitute a steel cord at low cost. However, the flexural rigidity is higher than that of the structure of which the number of filaments is four or five, and it is difficult to obtain a comfortable ride. Thus, it is considered using fine filaments to increase the cord strength. However, this increases the degree of filament processing and makes it difficult to produce a steel cord by twisting the filaments.

Figure 5:
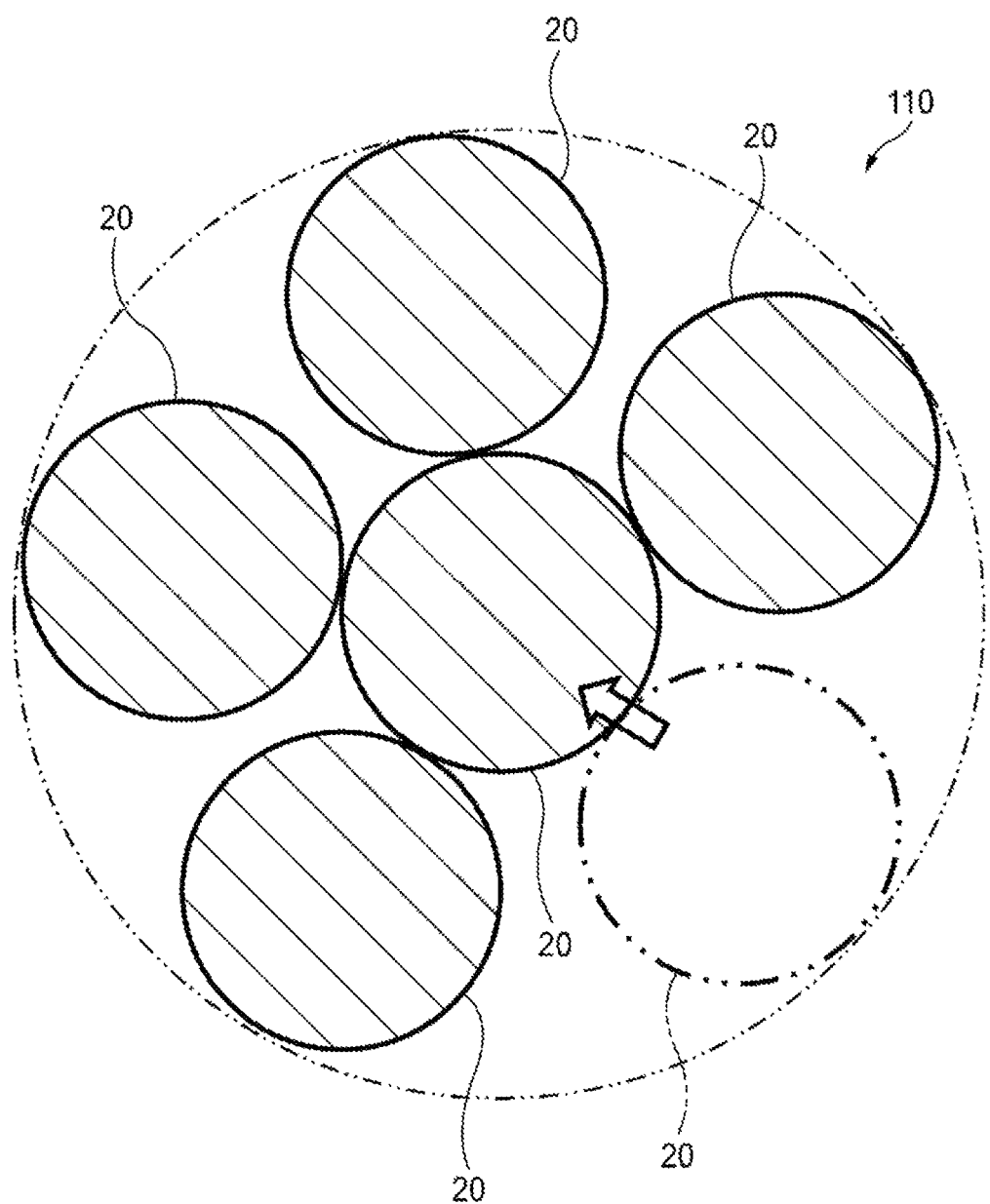
FIG. 5 is a diagram illustrating a steel cord having a 1×5 structure.

FIG. 5 is a diagram illustrating a steel cord 110 having a 1×5 structure. In the steel cord 110 having the 1×5 structure, the number of filaments 20 is five, and it is easy to constitute the steel cord 110 having low flexural rigidity. However, because the number of used filaments 20 is larger than that of a structure of which the number of filaments 20 is three or four, the cost is increased. Furthermore, in a cross section perpendicular to the longitudinal direction of the steel cord 110, the filaments 20 may be unevenly arranged. Alternatively, even if the steel cord 110 can be manufactured such that the filaments 20 are uniformly dispersed, it is difficult to keep the positions of the filaments 20 without change. For example, as illustrated in FIG. 5, there may be a case in which one of the five filaments 20 is shifted towards the center. In this way, when the filaments 20 are uneven in a cross section, the average diameter of the steel cord 110 is not uniform in the longitudinal direction, which adversely affects the performance of the tire. Further, as illustrated in FIG. 5, in the steel cord 110 having the 1×5 structure, a large gap inevitably occurs between the five filaments 20. Thus, it is difficult to reduce the ratio of the cord diameter to the cross-sectional area of the filament 20. Thus, it is difficult to reduce the weight while maintaining a necessary strength.

Figure 6:
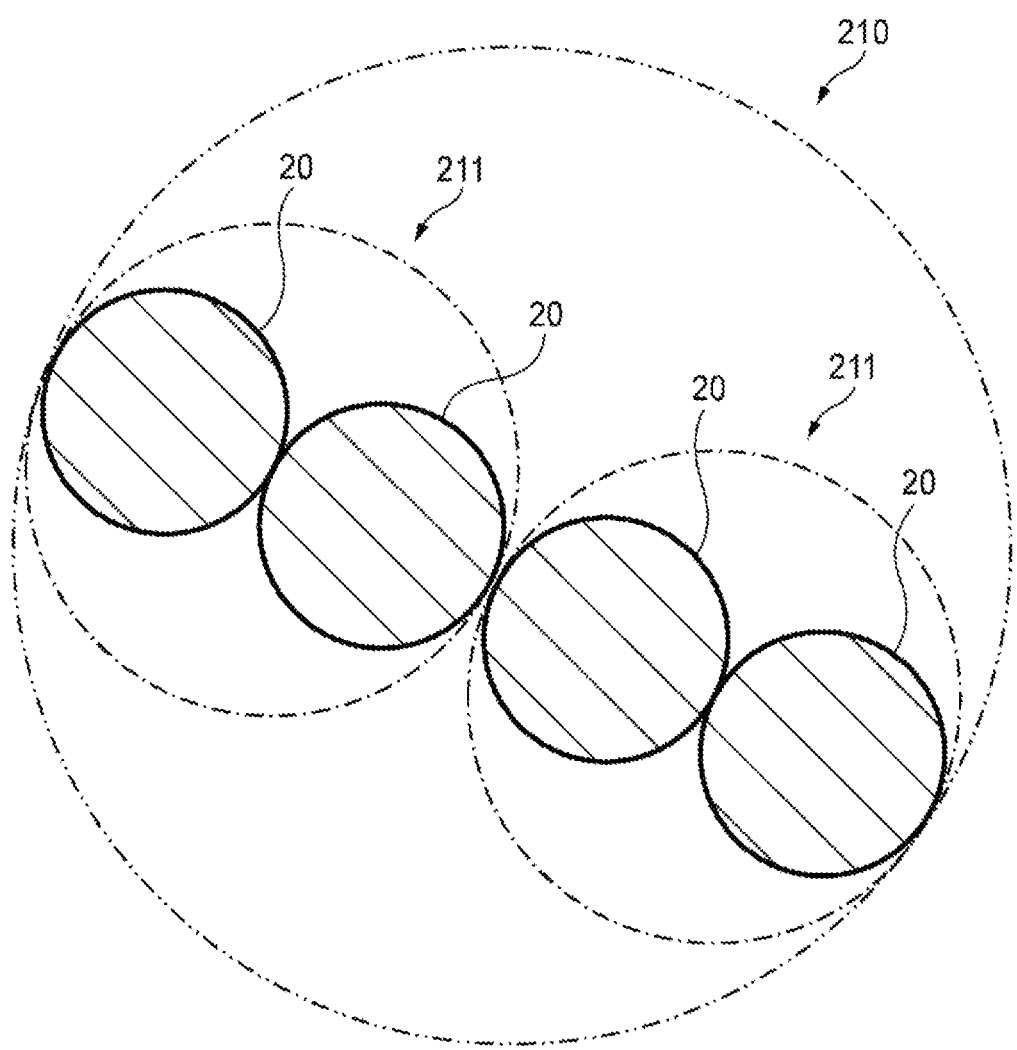
FIG. 6 is a diagram illustrating a steel cord having a 2+2 structure.

FIG. 6 is a diagram illustrating a steel cord 210 having a 2+2 structure. The steel cord 210 having the 2+2 structure is constituted by twisting two sets of two twisted filaments 211. The steel cord 210 having the 2+2 structure is excellent in balance between the cord strength and the cost. However, in the steel cord 210 having the 2+2 structure, in a cross section perpendicular to the longitudinal direction of the steel cord 210, the filaments 20 are likely to be unevenly arranged. For example, as illustrated in FIG. 6, in this cross section, there may be a case in which the filaments 20 are aligned in the radial direction in a straight line. In this way, when the filaments 20 are uneven in a cross section, the average diameter of the steel cord 210 is not uniform in the longitudinal direction, which adversely affects the performance of the tire. Further, as illustrated in FIG. 6, in the steel cord 210 having the 2+2 structure, a large gap inevitably occurs between the four filaments 20. Thus, it is difficult to reduce the ratio of the cord diameter to the cross-sectional area of the filament 20. Thus, it is difficult to reduce the weight while maintaining a necessary strength.

In the steel cord 10 having the 1×4 structure, the cord strength and the cost are balanced, and it is easy to reduce the weight while maintaining a necessary strength. Further, as illustrated in FIG. 3, in a cross section perpendicular to the longitudinal direction of the steel cord 10, the filaments 20 are equally distributed and arranged. In addition, as illustrated in FIG. 3, the gap formed between the four filaments 20 is small. Therefore, it is easy to increase the ratio of the cord diameter to the cross-sectional area of the filament 20. Therefore, it is easy to reduce the weight while maintaining a necessary strength. Moreover, it is easy to maintain this shape. Therefore, the average diameters of the steel cords 10 are likely to be uniform in the longitudinal direction, and the performance as the tire 1 is also high.

As a result of the above consideration, the inventors of the present invention have found that steel cords 10 having a 1×4 structure are excellent in balance between low cost, weight reduction, ride comfort, and tire performance. Further, as will be described in detail later below, the inventors have found that ride comfort can be further enhanced by making T/D that is greater than or equal to 1.25 and less than or equal to 2.25 when a center-to-center distance between the steel cords 10 in at least two belt layers 7 adjacent in the radial direction is T, and an average diameter of virtual circumscribed circles of the steel cords 10 is D.

Using filaments having the same diameter and on which bent portions and non-bent portions were similarly formed, steel cords having a 1×4 structure were produced. The value of the ratio T/D between an interval in the radial direction between the centers of the steel cords in the belt layers that are adjacent to each other in the radial direction (center-to-center distance) T and an average diameter D of virtual circumscribed circles of the steel cords having the 1×4 structure was set to be various values such that the following tires of Examples 1 to 7 and Comparative Examples 1 and 3 were produced to be evaluated. Note that the center-to-center distance T between the steel cords 10 in at least two belt layers 7 adjacent in the radial direction is, as illustrated in FIG. 2, a distance between the centers 10c of the steel cords 10 in the belt layers 7 that are adjacent to each other in the radial direction of the tire 1.

EXAMPLE 1

Steel cords having a 1×4 structure were produced using filaments having a diameter of 0.30 mm. For one of four filaments, bent portions and non-bent portions were formed such that the repetition pitch was 3.0 mm and the bending height was 0.5-fold of the diameter of the filament. The average diameter D of virtual circumcircle circles of this steel cord having the 1×4 structure was 0.72 mm. Using the steel cords, belt layers were constituted to produce a tire of Example 1. The center-to-center distance T between cords was made to be 1.47 mm. In Example 1, T/D was 2.04.

EXAMPLE 2

Using the steel cords produced in Example 1, belt layers were constituted to produce a tire of Example 2. The center-to-center distance T between cords was made to be 1.30 mm. In Example 2, T/D was 1.81.

EXAMPLE 3

Using the steel cords produced in Example 1, belt layers were constituted to produce a tire of Example 3. The center-to-center distance T between cords was made to be 1.27 mm. In Example 3, T/D was 1.77.

EXAMPLE 4

Using the steel cords produced in Example 1, belt layers were constituted to produce a tire of Example 4. The center-to-center distance T between cords was made to be 1.13 mm. In Example 4, T/D was 1.57.

EXAMPLE 5

Using the steel cords produced in Example 1, belt layers were constituted to produce a tire of Example 5. The center-to-center distance T between cords was made to be 1.12 mm. In Example 5, T/D was 1.55.

EXAMPLE 6

Using the steel cords produced in Example 1, belt layers were constituted to produce a tire of Example 6. The center-to-center distance T between cords was made to be 0.99 mm. In Example 6, T/D was 1.38.

EXAMPLE 7

Using the steel cords produced in Example 1, belt layers were constituted to produce a tire of Example 7. The center-to-center distance T between cords was made to be 0.96 mm. In Example 4, T/D was 1.34.

COMPARATIVE EXAMPLE 1

Using the steel cords produced in Example 1, belt layers were constituted to produce a tire of Comparative Example 1. The center-to-center distance T between cords was made to be 1.67 mm. In Comparative Example 1, T/D was 2.32.

COMPARATIVE EXAMPLE 2

Using the steel cords produced in Example 1, belt layers were constituted to produce a tire of Comparative Example 2. The center-to-center distance T between cords was made to be 0.83 mm. In Comparative Example 2, T/D was 1.15.

Figure 7:
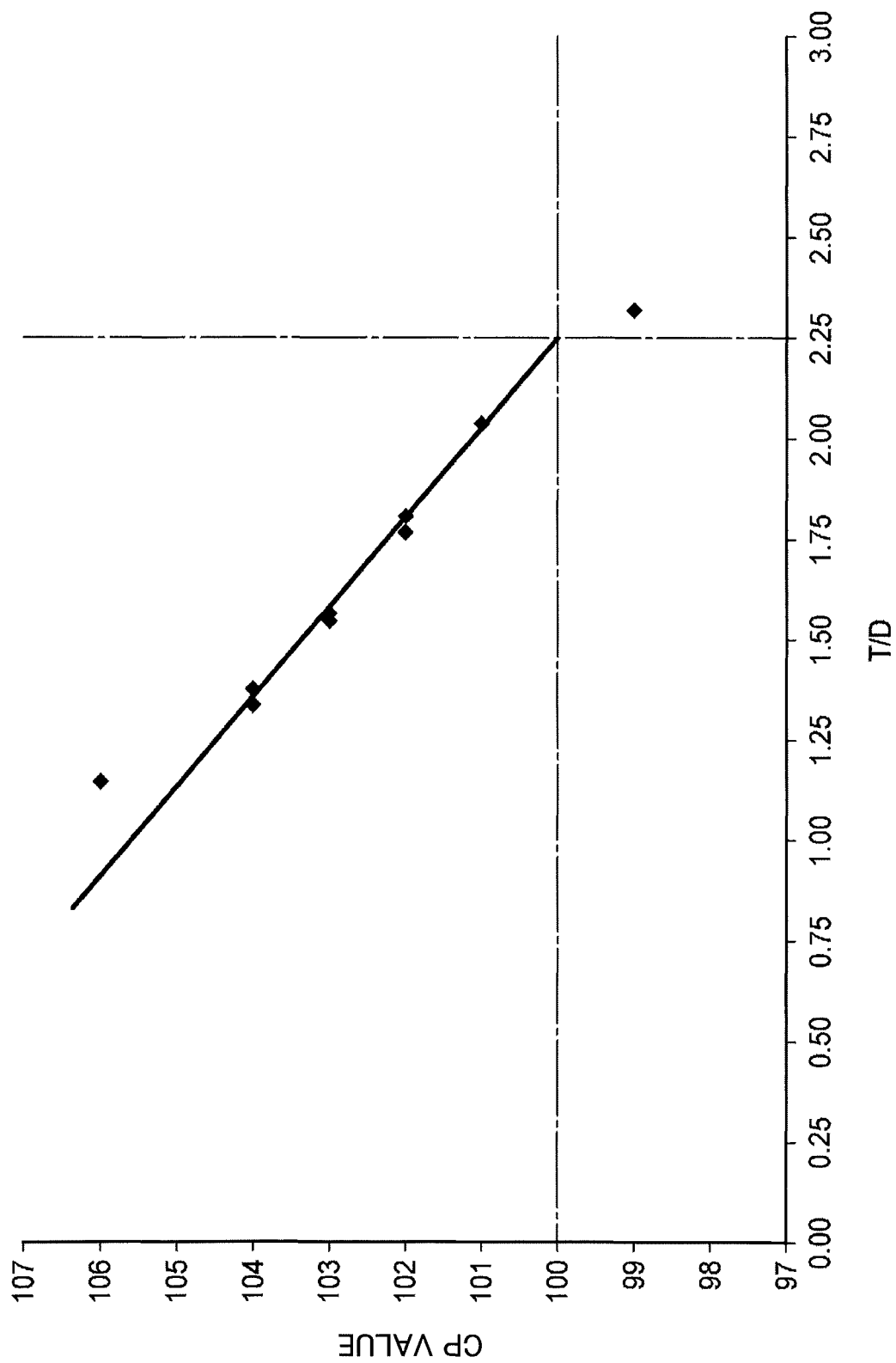
FIG. 7 is a diagram illustrating a relationship between T/D and a CP value.

CP (cornering power) values of the tires of Examples 1 to 7 and Comparative Examples 1 and 2 were measured. Table 1 indicates the average diameters D of virtual circumcircle circles of the steel cords, the center-to-center distances T between the cords, T/D, and the CP values. FIG. 7 is a diagram illustrating a relationship between T/D and the CP value. The vertical axis of FIG. 7 is for the calculated CP values according to Examples 1 to 7 and Comparative Examples 1 and 2, when the CP value for which the center-to-center distance T between cords is 1.62 mm (T/D=2.25) is 100.

for securing the CP value of 100 or more, and it is difficult to secure the stiffness as a tire. When the rubber elastic modulus E* is greater than or equal to 20 MPa, although the CP value is easily increased, processing is difficult and the productivity greatly degrades. A preferable range of the rubber elastic modulus E* is greater than or equal to 7 MPa and less than or equal to 20 MPa, and a more preferable range of the rubber elastic modulus E* is greater than or equal to 8 MPa and less than or equal to 12 MPa.

Figure 9:
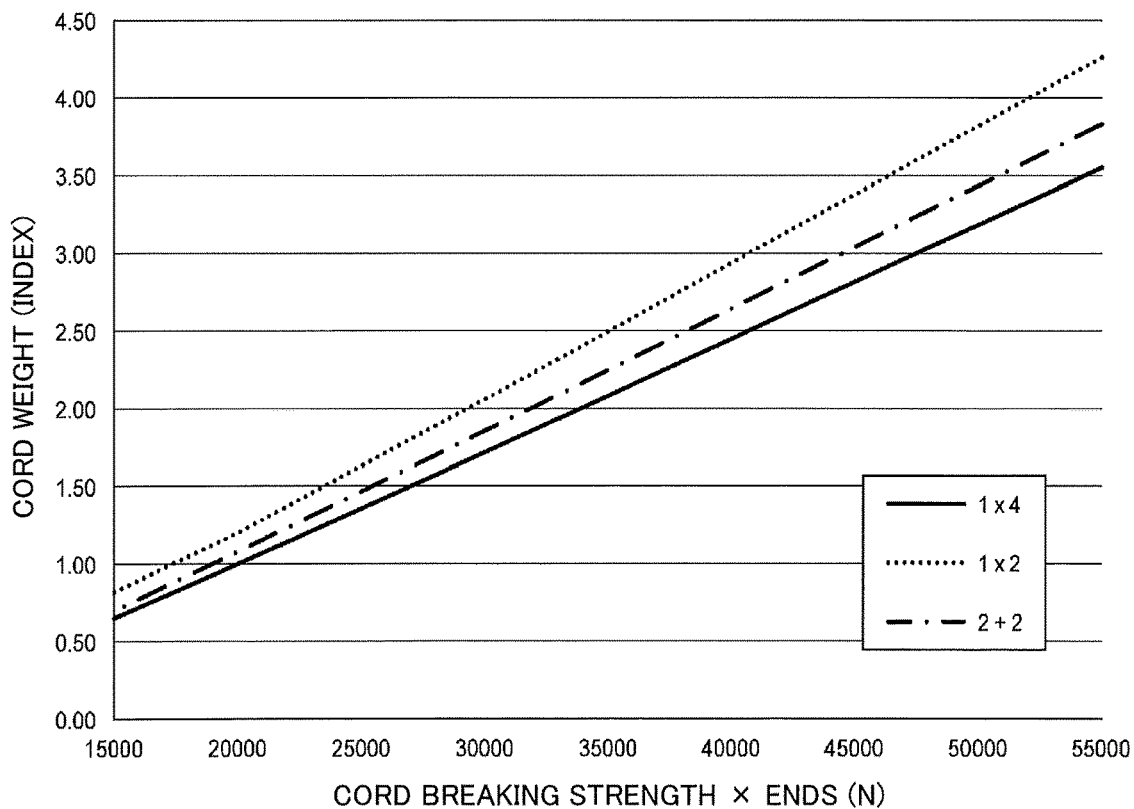
FIG. 9 is a diagram illustrating a relationship between an index, obtained from a cord weight, and cord breaking strength×ends.

FIG. 9 is a diagram illustrating a relationship between an index, obtained from a cord weight, and cord breaking strength×ends. The relationship between the index, obtained from the cord weight, and the cord breaking strength×ends

TABLE 1

| | EXAMPLE 1 | EXAMPLE 2 | EXAMPLE 3 | EXAMPLE 4 | EXAMPLE 5 | EXAMPLE 6 | EXAMPLE 7 | COMPARATIVE EXAMPLE 1 | COMPARATIVE EXAMPLE 2 |
|---|---|---|---|---|---|---|---|---|---|
| AVERAGE DIAMETER D OF CORDS | 0.72 | 0.72 | 0.72 | 0.72 | 0.72 | 0.72 | 0.72 | 0.72 | 0.72 |
| CENTER-TO-CENTER DISTANCE T BETWEEN CORDS | 1.47 | 1.30 | 1.27 | 1.13 | 1.12 | 0.99 | 0.96 | 1.67 | 0.83 |
| T/D | 2.04 | 1.81 | 1.77 | 1.57 | 1.55 | 1.38 | 1.34 | 2.32 | 1.15 |
| CP VALUE | 101 | 102 | 102 | 103 | 103 | 104 | 104 | 99 | 106 |

As illustrated in FIG. 7, the CP value increased as T/D decreased. In order to ensure a comfortable ride, the CP value is preferably higher. From the results illustrated in FIG. 7, it was found that, when T/D is larger than 2.25, the CP value is lower than 100 in FIG. 7 and it is difficult to secure a comfortable ride, but when T/D is less than or equal to 2.25, the CP values are greater than or equal to 100 and it is possible to secure a more comfortable ride. In a case where the average diameters D of virtual circumcircle circles of the steel cords are constant, T/D decreases as the center-to-center distance T between the cords decreases. When the center-to-center distance T between the cords is short, it is possible to reduce the amount of rubber with which gaps between steel cords adjacent to each other in the radial direction are filled. Therefore, tires according to the present invention can secure a comfortable ride while reducing the amount of rubber and reducing the weight. Note that when the center-to-center distance T between the cords is too short, the durability degrades because there is a possibility that steel cords are not covered with rubber. Therefore, T/D is set to be greater than or equal to 1.25.

Figure 8:
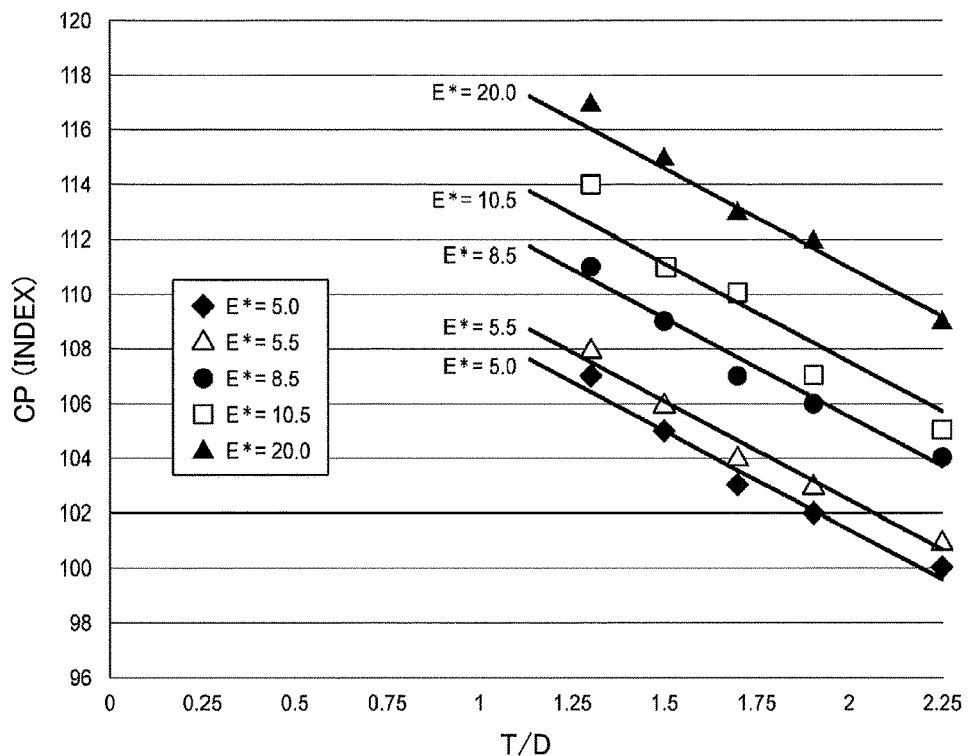
FIG. 8 is a diagram illustrating a relationship between T/D, CP values, and rubber elastic modulus E*.

FIG. 8 is a diagram illustrating a relationship between T/D, the CP values of tires, and rubber elastic modulus E*. The rubber elastic modulus E* is an index indicative of viscoelasticity of rubber. Rubber elastic modulus is also called complex elastic modulus or dynamic viscoelasticity. The rubber elasticity modulus E* of each tire was measured with a spectrometer manufactured by TOYO SEIKI CO., LTD, with respect to a small piece (a test piece) of the tire having a width of 5 mm, a thickness of 2 mm, and a length of 20 mm, at an initial load of 150 g, a frequency of 50 Hz, a dynamic strain of 1%, and a temperature of 70° C.

FIG. 8 illustrates a graph relating to rubber elastic modulus E* and CP values. As illustrated in FIG. 8, in a case where the CP value is 100 at the time of E* being 5.0 MPa and T/D being 2.25 is 100, the CP value increases as E* increases. However, when the rubber elastic modulus E* is less than 5 MPa, it is inevitable to decrease the value of T/D is illustrated for each of cords having a 1×4 structure cord, cords having a 1×2 structure cord, and cords having a 2+2 structure cord. Note that the ends is the number of cords that are present per 5 cm width of a belt layer in a cross section perpendicular to the extending direction of the cords (cross section illustrated in FIG. 2).

As illustrated in FIG. 9, when a tire whose cord breaking strength×ends is 30,000 N is desired, for example, the lightest tire can be obtained by using the cords having the 1×4 structure. The 1×4 structure is the lightest, the 2+2 structure is the second lightest, and the 1×2 structure is the third lightest. Also, for example, in a case where a tire whose index of the code weight is 2.50 is desired, the cord breaking strength×ends can be maximized by using the cords having the 1×4 structure. For the cord breaking strength×ends, the 1×4 structure is the largest, the 2+2 structure is the second largest, and the 1×2 structure is the third largest. For example, in a case where a required cord breaking load×ends is the same, adopting the 1×4 structure makes it possible to reduce the weight by approximately 10% as compared with the 1×2 structure and by approximately 5% as compared with the 2+2 structure. In this way, using the cords having the 1×4 structure makes it easy to constitute a lightweight tire while securing a necessary strength.

Note that it is preferable that the cord breaking load×ends is greater than or equal to 15,000 N and less than or equal to 40,000 N. If the cord breaking load×ends is less than 15,000 N, strength is insufficient and durability significantly decreases. If the cord breaking load×ends is greater than 40,000 N, there is a high possibility that the steering stability decreases. Note that it is desirable that the cord breaking load×ends is greater than or equal to 18,000 N and less than or equal to 37,000 N.

Note that although a tire includes two belt layers in the embodiment described above, the present invention is not limited to this. A tire may include three or more belt layers in which at least two of the belt layers adjacent to each other in the radial direction satisfy 1.25≤T/D≤2.25.

A tire according to the present invention can be applied to automobile tires such as passenger cars, ultralight trucks, light trucks, truck and buses, airplane tires, and the like.

DESCRIPTION OF THE REFERENCE NUMERAL 1 tire
7 belt layer
10 steel cord
11 rubber
20 filament
21 bent portion
22 non-bent portion
h bending height
p repetition pitch
D average diameter of virtual circumscribed circles of a steel cord
T center-to-center distance

The invention claimed is:

1. A tire comprising a plurality of belt layers superimposed in a radial direction,
   wherein the belt layers include a plurality of steel cords arranged in parallel in a row and rubber that covers the steel cords, and
   wherein the steel cords have a 1×4 structure in which four filaments are twisted, and when a center-to-center distance between the steel cords in at least two of the belt layers adjacent in the radial direction is T, and an average diameter of virtual circumscribed circles of the steel cords is D, T/D is in a range of greater than or equal to 1.34 and less than or equal to 2.04,
   wherein the average diameter D is 0.72 mm, and the center-to-center distance T is greater than or equal to 0.96 mm and less than or equal to 1.47 mm,
   wherein in the at least two of the belt layers, a steel cord breaking load×ends/50 mm is greater than or equal to 15,000 N/50 mm and less than or equal to 40,000 N/50 mm, and
   wherein cornering power for the tire over the range for the T/D increases as a value of the T/D decreases.

2. The tire according to claim 1, wherein the elastic modulus E* of the rubber is greater than or equal to 5 MPa and less than or equal to 20 MPa.

3. The tire according to claim 1, wherein, in each cross-sectional view of a plane perpendicular to a longitudinal direction of each of the steel cords, the central portion surrounded by the four filaments is filled with the rubber.

4. The tire according to claim 1, wherein, in at least one filament of the four filaments of each of the steel cords, bent portions and non-bent portions are repeatedly formed along a longitudinal direction of the filament.

5. The tire according to claim 4, wherein a repetition pitch of the bent portions and the non-bent portions of the at least one filament is greater than or equal to 2.2 mm and less than or equal to 7.0 mm.

6. The tire according to claim 4,
   wherein when the at least one filament is placed on a plane, a height from the plane to the bent portions, at a far side from the plane, is defined as a bending height, and
   wherein the bending height of each of the at least one filament is 0.2-fold or more and 0.8-fold or less of a diameter of the filament.

7. The tire according to claim 1, wherein the cornering power for the tire over the range for the T/D increases linearly as the value of the T/D decreases.

* * * * *